A. P. WOOD.
BICYCLE ATTACHMENT.
APPLICATION FILED MAY 5, 1910.
1,010,836.
Patented Dec. 5, 1911.
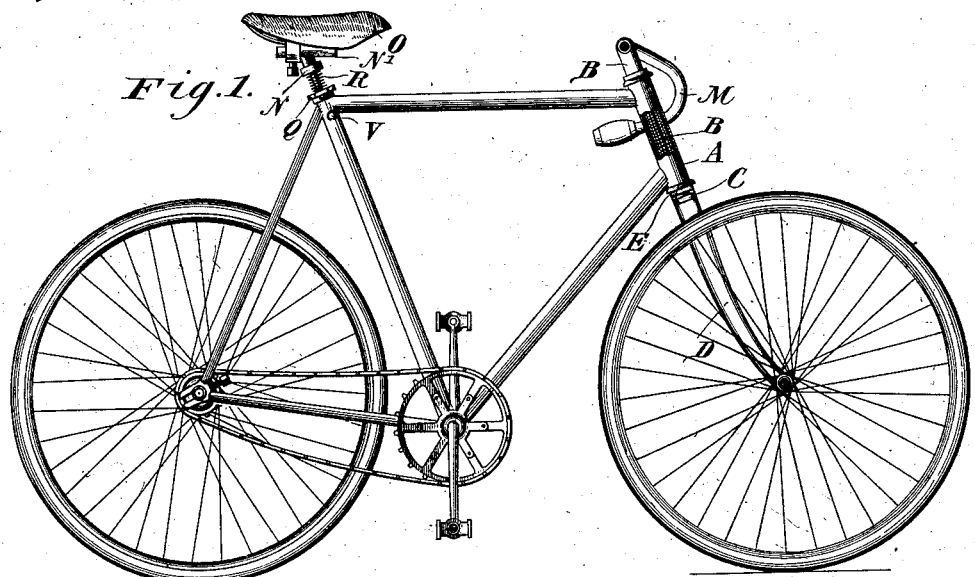
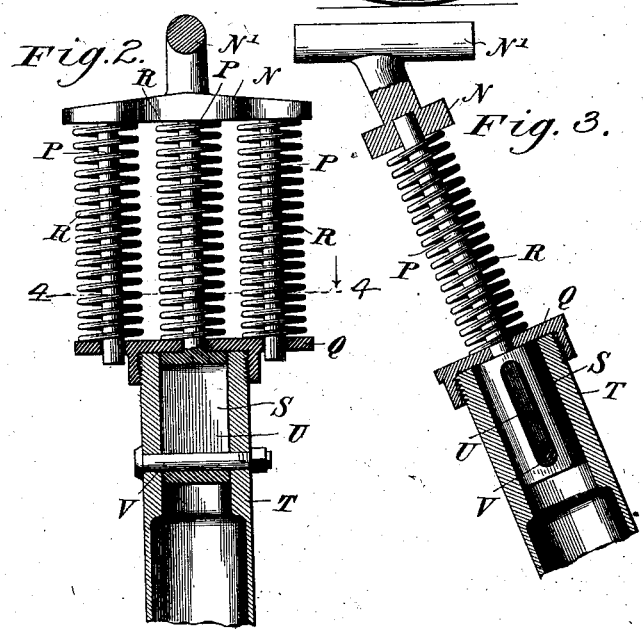
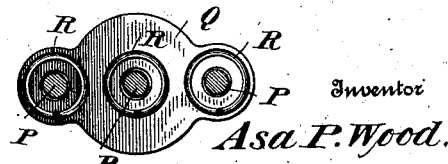
Inventor
Asa P. Wood.

UNITED STATES PATENT OFFICE.

ASA P. WOOD, OF HAMBURG, NEW YORK.

BICYCLE ATTACHMENT.

1,010,836.  Specification of Letters Patent.  Patented Dec. 5, 1911.

Application filed May 5, 1910. Serial No. 559,521.

*To all whom it may concern:*

Be it known that I, ASA P. WOOD, a citizen of the United States, residing at Hamburg, in the county of Erie and State of New York, have invented a new and useful Improvement in Bicycle Attachments, of which the following is a specification.

This invention relates to improvements in bicycles, and has for its object to provide means whereby the saddle may be supported resiliently, so as to obviate the jarring incident to the passage of the wheels of a bicycle or tricycle over rough ground, stones, or other obstructions, thus adding greatly to the comfort of the rider, as well as preserving the bicycle against injury caused by such constant jarring.

With this and other objects in view, the invention consists in the novel features of construction, combination and arrangement of parts, hereinafter fully described and pointed out in the claim.

In the drawing forming a part of this specification: Figure 1 is a side elevation of a bicycle equipped with my improved devices. Fig. 2 is a vertical section taken transversely of the frame showing the application of my improved device for supporting the saddle. Fig. 3 is a vertical section taken longitudinally of the frame showing the same mechanism as in Fig. 2. Fig. 4 is a horizontal section on the line 4—4 of Fig. 2.

Referring to the drawings, A is the forward portion or head of the bicycle frame. B is the steering bar or rod, which projects downwardly through said head, the lower end of the steering bar being in rigid attachment to a cross head C, slidably secured between the two forward forks D, of the frame, which are connected by the usual cross head E.

My invention for supporting the seat consists of a cross head N having formed integral therewith a projected portion N' for supporting the saddle O. The said cross head N is provided with three downwardly projecting rods P, each parallel to the other, the two outer rods being projected through apertures adjacent to the ends of another cross head Q. The central rod is also projected through said cross head, but does not terminate as do the other rods, but is secured to the upper end of a tubular portion S adapted to be slidably confined within the upper end of the tube T, and provided with a vertical slot U and said cylindrical portion confined therein by the cross pin V. The said cross head Q is screw-threaded upon the upper end of said tubular portion T. Encircling each of said rods P, I provide strong spiral springs R having their bearings between the lower surface of the cross head N and the upper surface of the cross head Q. The said cross head Q is of course stationary, but the cross head N is movable, its vertical movement being limited by the play of the springs R, which in turn are limited by the extent of the vertical slot U and the cross pin V. Thus upon encountering a stone or any rough or uneven surface, the rod N' will be resiliently borne upon said springs R and the comfort of the rider greatly enhanced. At the same time the jarring, ordinarily felt when the handle bar is grasped, is avoided by the mechanism at the end of the frame. By my improved construction, the rider, is thus resiliently supported upon the frame of the bicycle. The springs, however, should not be too resilient so as to transmit a constant motion to the rider, but should be sufficiently stiffened so as to be acted upon only while the passage is over rough ground or obstructions encountered.

Having thus fully described my invention, what I claim as new and desire to secure by Letters Patent is:—

The combination with a bicycle having a frame comprising a tubular portion, of a cross head having an integral seat support, a second cross head having three openings, three parallel rods depending from the first mentioned cross head and adapted to work through the openings of the second cross head, spiral springs arranged between the cross heads and encircling said rods, a vertically slotted tube carried by one of said rods, and below the second cross head, said tube being adapted to slide in the tubular portion of the frame, and a bolt passing through the slot of the tube and limiting its movement relative to said frame, the rod carrying said tube being arranged between the two other rods.

ASA P. WOOD.

Witnesses:
 J. C. DOEDEMA,
 W. W. WHITE.

Copies of this patent may be obtained for five cents each, by addressing the "Commissioner of Patents, Washington, D. C."